United States Patent
Park et al.

(10) Patent No.: US 9,661,662 B2
(45) Date of Patent: *May 23, 2017

(54) METHOD FOR PERFORMING RANDOM ACCESS PROCEDURE IN WIRELESS COMMUNICATION SYSTEM

(71) Applicant: LG ELECTRONICS INC., Seoul (KR)

(72) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/268,224

(22) Filed: Sep. 16, 2016

(65) Prior Publication Data

US 2017/0006642 A1  Jan. 5, 2017

Related U.S. Application Data

(63) Continuation of application No. 14/814,997, filed on Jul. 31, 2015, now Pat. No. 9,480,085, which is a (Continued)

(30) Foreign Application Priority Data

Aug. 15, 2007 (KR) .................. 10-2007-0082053

(51) Int. Cl.
*H04B 7/216* (2006.01)
*H04W 72/00* (2009.01)
(Continued)

(52) U.S. Cl.
CPC ... *H04W 74/0833* (2013.01); *H04W 72/0413* (2013.01); *H04W 74/002* (2013.01)

(58) Field of Classification Search
CPC ......... H04L 29/12018; H04L 29/12943; H04L 61/10; H04L 61/6072; H04W 74/002;
(Continued)

(56) References Cited

U.S. PATENT DOCUMENTS 6,643,275 B1  11/2003  Gustafsson et al.
6,778,835 B2   8/2004  You et al.
(Continued)

FOREIGN PATENT DOCUMENTS

EP  1509012      2/2005
JP  2003-244057  8/2003
(Continued)

OTHER PUBLICATIONS

LG Electronics: "DRX Scheme", 3GPP TSG-RAN WG2 #56bis, R2-070265, Jan. 15-19, 2007.
(Continued)

*Primary Examiner* — Awet Haile
(74) *Attorney, Agent, or Firm* — Dentons US LLP (57) ABSTRACT

There is provided a method for enabling a user equipment to perform a random access procedure in a wireless communication system. The method includes transmitting a random access preamble and receiving a random access response as a response to the random access preamble. The random access response is addressed by a random access identifier. The random access identifier is mapped to radio resources used for transmitting the random access preamble. The user equipment can immediately confirm its random access response and perform further efficient random access procedure.

10 Claims, 5 Drawing Sheets

Related U.S. Application Data continuation of application No. 13/967,895, filed on Aug. 15, 2013, now Pat. No. 9,131,493, which is a continuation of application No. 12/310,322, filed as application No. PCT/KR2007/004016 on Aug. 22, 2007, now Pat. No. 8,619,682.

(60) Provisional application No. 60/823,371, filed on Aug. 23, 2006, provisional application No. 60/896,250, filed on Mar. 21, 2007.

(51) Int. Cl.
    *H04W 74/08* (2009.01)
    *H04W 72/04* (2009.01)
    *H04W 74/00* (2009.01)

(58) Field of Classification Search
    CPC . H04W 74/006; H04W 74/0833; H04W 8/26; H04W 52/0216; H04W 72/042
    See application file for complete search history.

(56) References Cited

U.S. PATENT DOCUMENTS

| | | | |
|---|---|---|---|
| 7,079,873 | B2 | 7/2006 | Fan et al. |
| 7,872,986 | B2 | 1/2011 | Chun et al. |
| 7,912,471 | B2 | 3/2011 | Kodikara Patabandi et al. |
| 2003/0125037 | A1 | 7/2003 | Bae et al. |
| 2004/0014452 | A1 | 1/2004 | Lim et al. |
| 2004/0146019 | A1 | 7/2004 | Kim et al. |
| 2004/0229659 | A1 | 11/2004 | Boos et al. |
| 2005/0002361 | A1 | 1/2005 | Dick et al. |
| 2005/0180378 | A1 | 8/2005 | Lee et al. |
| 2006/0126570 | A1 | 6/2006 | Kim et al. |
| 2006/0268772 | A1 | 11/2006 | Ko et al. |
| 2007/0064665 | A1* | 3/2007 | Zhang ............... H04W 72/1226 370/343 |
| 2007/0109987 | A1 | 5/2007 | Kohlmann et al. |
| 2007/0183355 | A1 | 8/2007 | Kuchibhotla et al. |
| 2007/0206531 | A1* | 9/2007 | Pajukoski ......... H04W 74/0866 370/329 |
| 2007/0230400 | A1 | 10/2007 | Kuchibhotia et al. |
| 2007/0286080 | A1 | 12/2007 | Kim et al. |
| 2007/0291719 | A1 | 12/2007 | Demirhan et al. |
| 2007/0291728 | A1 | 12/2007 | Dalsgaard et al. |
| 2008/0049669 | A1 | 2/2008 | Lundby et al. |
| 2008/0081628 | A1 | 4/2008 | Ye et al. |
| 2008/0101268 | A1 | 5/2008 | Sammour et al. |
| 2008/0108346 | A1 | 5/2008 | Umatt et al. |
| 2008/0117891 | A1 | 5/2008 | Damnjanovic et al. |
| 2008/0167089 | A1 | 7/2008 | Suzuki et al. |
| 2008/0186892 | A1 | 8/2008 | Damnjanovic |
| 2008/0214249 | A1 | 9/2008 | Kim et al. |
| 2008/0267118 | A1 | 10/2008 | Cai et al. |
| 2008/0273610 | A1* | 11/2008 | Malladi ................ H04L 1/0029 375/260 |
| 2009/0252124 | A1 | 10/2009 | Yeo et al. |

FOREIGN PATENT DOCUMENTS

| | | |
|---|---|---|
| JP | 2005-525761 A | 8/2005 |
| JP | 2006-515737 A | 6/2006 |
| KR | 10-2005-0040688 A | 5/2005 |
| KR | 10-2008-0015704 A | 2/2008 |
| TW | 200531489 A | 9/2005 |
| WO | 03096739 A1 | 11/2003 |
| WO | 2004/064272 A1 | 7/2004 |
| WO | 2006019267 | 2/2005 |
| WO | 2007/013457 A1 | 2/2007 |
| WO | 2007013457 A1 | 2/2007 |
| WO | 2007025138 | 3/2007 |
| WO | 2007073118 | 6/2007 |
| WO | 2008/024283 A2 | 2/2008 |

OTHER PUBLICATIONS

R2-063120—3GPP TSG-RAN2 Meeting #56, Riga, Latvia, Nov. 6-Nov. 10, 2006, Samsung "DRX operations for connected mode UEs in LTE".
R2-070120—3GPP TSG RAN WG2 #56bis, Sorrento, Italy, Jan. 15-19, 2007, ETRI "DRX control in LTE_Active".
RP-070169—3GPP TSG RAN Meeting #35, Lemesos, Cyprus, Mar. 6-9, 2007.
3GPP TSG RAN WG2 #54 R2-062164 Aug. 28-Sep. 1, 2006 Tallinn, Estonia Agenda item: 11.8.3 NTT DoCoMo, Inc.; Uplink resource allocation scheme.
DRX Scheme, 3GPP TSG-RAN WG2 #56bis, LG Electronics; Jan. 15-Jan. 19, 2007 Sorrento, Italy; R2-070265.
Issues on DRX in LTE Active, 3GPP TSG-RAN WG2 Meeting #57, Ericsson, St. Louis, Missouri, USA, Feb. 12-16, 2007; R2-070797.
Samsung, "DRX operations for connected mode UEs in LTE", Agenda Item: 19, Document for: Discussion & Decision, 3GPP TSG-RAN2 Meeting #56, Riga, Lativa, Nov. 6-Nov. 10, 2006, R2-063120.
Motorola: "Random Access Procedure and Message Contents", 3GPP TSG-RAN W2 AH, Jun. 27-30, 2006, Cannes, France, R2-061991.
LG Electronics: "Initial Access Procedure", 3GPP TSG WG2 Ad Hoc on LTE, Jun. 27-30, 2006, Cannes, France, R2-061986.
3GPP TSG RAN WG2 #56, Riga, Latvia, Nov. 6-10, 2006, R2-063183, pp. 1-6.
3GPP TSG-RAN WG2 #55, Seoul Korea, Oct. 9-Oct. 13, 2006, R2-062927, pp. 1 3.
3GPP TSG RAN WG2 #54, Tallinn, Estonia, Aug. 28-Sep. 1, 2006, R2-062164, pp. 1 5.
3GPP TSG-RAN2 #54, Tallinn, Estonia, Aug. 28-Sep. 1, 2006, R2-062227, pp. 1 5.
"DRX operations for connected mode UEs in LTE; R2-063120", 3GPP Draft; R2-063120 DRX for Connected UE, 3rd Generation Partnership Project (3GPP), Mobile Competence Centr, 650, Route Des Lucioles , F-06921 Sophia-Antipolis Cedex , France, vol. RAN WG2, Nov. 2006.
3rd Generation Partnership Project: "3rd Generation Partnership Project; Technical Specification Group Radio Access Network; Physical Channels and Modulation (Release 8)"; 3GPP TS 36.211 V1.0.0;RP-070169, Mar. 2007, Retrieved from the Internet: URL:http://ftp.3gpp.org/ftp/tsg_ran/TSG_RAN/TSGR_35/Docs/>.
A Ericsson: "Issues on DRX in LTE Active; R2-070797", 3GPP Draft; R2-070797, 3rd Generation Partnership Project (3GPP), vol. RAN WG2, Feb. 2007.
ETRI: "DRX control in LTE_Active; R2-070120", 3GPP Draft; R2-070120_DRX Control in LTE, 3rd Generation Partnership Project (3GPP), vol. RAN WG2, Jan. 2007.
"Views on DRX/DTX control in LTE; R2-063397"Internet Citation, [Online], Nov. 2006, pp. 1-3, Retrieved from the Internet : URL: ftp://ftp.3gpp.org/tsg_ran/WG2_RLD/TSGR2_56/Documents/R2-0633972.zip>.
NTT Docomo et al: "LTE-fiCTIVE DRX control; R2-070776", 3GPP Draft; R2-070776, 3rd Generation Partnership Project (3GPP), vol. RAN WG2, Feb. 2007.
LG Electronics: "R2-070265, DRX Scheme", Retrieved from the Internet: URL: http://www.3gpp.org/ftp/tsg_ran/WG2_RL2/TSGR2_56bis/Documents/>, Jan. 2007.

* cited by examiner

METHOD FOR PERFORMING RANDOM ACCESS PROCEDURE IN WIRELESS COMMUNICATION SYSTEM

This application is a continuation application of U.S. application Ser. No. 14/814,997 filed on Jul. 31, 2015, which is a continuation application of U.S. application Ser. No. 13/967,895 filed on Aug. 15, 2013 (now issued as U.S. Pat. No. 9,131,493), which is a continuation application of U.S. application Ser. No. 12/310,322 filed on Feb. 20, 2009 (now issued as U.S. Pat. No. 8,619,682), and claims the benefit of PCT/KR2007/004016 filed on Aug. 22, 2007, U.S. Provisional application No. 60/823,371 filed on Aug. 23, 2006, U.S. Provisional application No. 60/896,250 filed on Mar. 21, 2007, and Korean Patent Application No. 10-2007-0082053 filed on Aug. 15, 2007, the contents of which are hereby incorporated herein by reference for all purposes in their entirety.

TECHNICAL FIELD

The present invention relates to wireless communication. More specifically, the invention relates to a method of performing a random access procedure in a wireless communication system.

BACKGROUND ART

Third generation partnership project (3GPP) mobile communication systems based on a wideband code division multiple access (WCDMA) radio access technique are widely deployed all over the world. High speed downlink packet access (HSDPA) that can be defined as a first evolutionary stage of WCDMA provides 3GPP with highly competitive radio access technique in the mid-term future. However, since requirements and expectations of users and service providers are continuously increased and developments of competing radio access techniques are continuously in progress, new technical evolutions in 3GPP are required to secure competitiveness in the future. Decrease of cost per bit, increase in service availability, flexible use of frequency bands, simple architecture and open interface, low power consumption of a user equipment and the like are suggested as requirements of next generation communication systems.

Generally, one or more cells are allocated to a base station. A plurality of user equipments can be placed in a cell. A user equipment generally performs random access procedure before accessing to a network. The objectives of the random access procedure may include 1) initial access, 2) handover, 3) scheduling request (request for radio resources), 4) timing synchronization, and the like.

Random access procedure in the initial access is performed as follows. A user equipment is turned on and tries to initially access a network. The user equipment establishes downlink synchronization with the network and receives system information from the network. Since the user equipment currently does not establish timing synchronization and does not have any uplink radio resources, the user equipment performs the random access procedure. The user equipment requests uplink radio resources for transmitting an access request message through the random access procedure. The network which receives the request for the uplink radio resources allocates the uplink radio resources to the user equipment. The user equipment can transmit the access request message to the network through the uplink radio resources.

The random access procedure can be classified into a contention based random access procedure and a non-contention based random access procedure. The most outstanding difference between the contention based random access procedure and the non-contention based random access procedure is whether a signature used for a random access preamble is dedicated to a user equipment. In the non-contention based random access procedure, since a user equipment uses a dedicated signature assigned only to itself as the random access preamble, a collision with other user equipments do not occur. The collision means that two or more user equipments simultaneously try a random access procedure using the same random access preamble through the same radio resources. In the contention based random access procedure, since a user equipment arbitrarily selects one signature among shared signatures as the random access preamble, the collision may occur.

Random access procedure in a wireless communication system based on conventional WCDMA system is described below.

The random access procedure in WCDMA system uses a physical random access channel (PRACH) as an uplink physical channel and an acquisition indicator channel (AICH) as a downlink physical channel. For the structures of the PRACH and the AICH, sections 5.2.2.1 and 5.3.3.7 of 3GPP TS 25.211 V7.0.0 (2006-03) "Technical Specification Group Radio Access Network; Physical channels and mapping of transport channels onto physical channels (FDD) (Release 7)" can be referenced.

The PRACH can be divided into a preamble part and a message part. The preamble part carries a signature. At first, a physical layer of a user equipment selects an access slot and the signature. The signature is transmitted through the access slot as a random access preamble. As an example of signatures, section 4.3.3.3 of 3GPP TS 25.213 V7.0.0 (2006-03) "Technical Specification Group Radio Access Network; Spreading and modulation (FDD) (Release 7)" can be referenced. The signature is selected from sixteen signatures. The random access preamble can be transmitted for 1.33 ms duration of the access slot.

If the user equipment transmits the random access preamble to a network, the network transmits a response message to the user equipment through the AICH. The response message includes the signature of the random access preamble so that the user equipment can identify the response message as the user equipment's. The network transmits an acknowledgement (ACK) or a negative-acknowledgement (NACK) to the user equipment through the response message. If the user equipment receives the ACK from the network, the user equipment transmits the message part using an orthogonal variable spreading factor (OVSF) code corresponding to the signature. If the user equipment receives the NACK from the network, the user equipment transmits another random access preamble through the PRACH after a certain time period. If the user equipment does not receive the response message corresponding to the random access preamble, the user equipment transmits a new random access preamble with power whose level is higher by one step than that of the previous random access preamble.

The network transmits the response message as a response to the random access preamble from the user equipment. The response message includes the signature that is the same as the signature used for the random access preamble. The user equipment identifies that the response message is the response to its random access preamble through the signature of the response message.

If the response message in the random access procedure carries a variety of information as much as possible, the efficiency of the random access procedure can be improved. For example, if the response message is generated by an upper layer of the physical layer, a variety of information can be transmitted at a time through the response message.

Since the random access procedure is used for a variety of purposes, it is required that the random access procedure should be efficiently configured to enhance performance of the wireless communication system as a whole. Therefore, there is a need for a method that can more efficiently process the random access procedure.

DISCLOSURE OF INVENTION

Technical Problem

The object of the present invention is to perform a random access procedure using a random access identifier.

Technical Solution

In one aspect, there is provided with a method for enabling a user equipment to perform a random access procedure in a wireless communication system. The method includes transmitting a random access preamble and receiving a random access response as a response to the random access preamble. The random access response is addressed by a random access identifier. The random access identifier is mapped to radio resources used for transmitting the random access preamble and is an identifier for identifying the user equipment performing the random access procedure.

In another aspect, there is provided with a method for enabling a user equipment to perform a random access procedure in a wireless communication system. The method includes receiving mapping information which is information on mapping between radio resources used for transmitting a random access preamble and a random access identifier for identifying the user equipment performing the random access procedure, transmitting the random access preamble and receiving the random access identifier mapped to the radio resources used for transmitting the random access preamble.

In still another aspect, there is provided with a method for enabling a base station to perform a random access procedure in a wireless communication system. The method includes transmitting mapping information which is information on mapping between radio resources used for transmitting a random access preamble and a random access identifier for identifying a user equipment performing the random access procedure, receiving the random access preamble, obtaining the random access identifier using the mapping information and the radio resources used for transmitting the random access preamble and transmitting a random access response addressed by the random access identifier.

Advantageous Effects

A random access identifier is mapped to radio resources used in the process of performing a random access procedure between a user equipment and a network. Through the mapping of the random access identifier to the radio resources, a user equipment can immediately confirm its random access response and efficiently perform the random access procedure.

MODE FOR THE INVENTION

Figure 1:
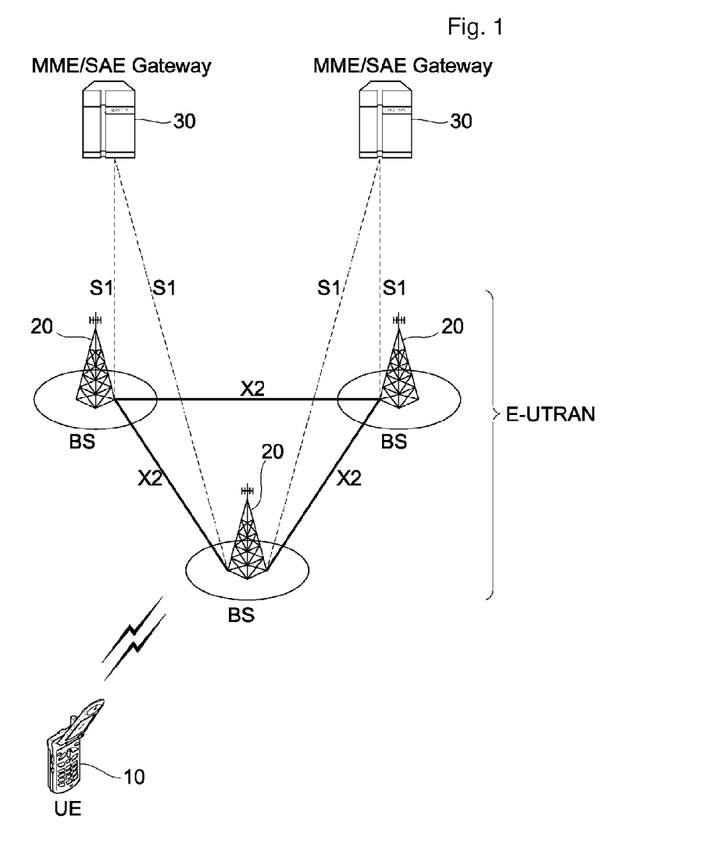
FIG. 1 is a block diagram showing a wireless communication system.

FIG. 1 is a block diagram showing a wireless communication system. This may be the network architecture of an evolved-universal mobile telecommunications system (E-UMTS). The E-UMTS may be referred to as a long term evolution (LTE) system. The wireless communication system is widely deployed to provide a variety of communication services such as audio data, packet data, or the like.

Referring to FIG. 1, evolved-UMTS terrestrial radio access network (E-UTRAN) includes a base station (BS) 20 for providing control plane and user plane.

A user equipment (UE) 10 can be fixed or mobile and can be referred to as other terminologies such as a mobile station (MS), user terminal (UT), subscriber station (SS), wireless device, or the like. The base station 20 generally means a fixed station that communicates with the user equipment 10 and can be referred to as other terminologies such as an evolved-NodeB (eNB), base transceiver system (BTS), access point, or the like. The base station 20 cane serves for at least one cell. An interface for transmitting user traffics or control traffics can be used between base stations 20. Hereinafter, downlink means communication from the base station 20 to the user equipment 10, and uplink means communication from the user equipment 10 to the base station 20.

The base stations 20 can be interconnected with each other by means of an X2 interface. The base station 20 is connected to evolved packet core (EPC), more specifically to a mobility management entity/system architecture evolution (SAE/MME) gateway 30, through an S1 interface. The S1 interface supports a many-to-many relation between the base station 20 and the MME/SAE gateway 30.

Figure 2:
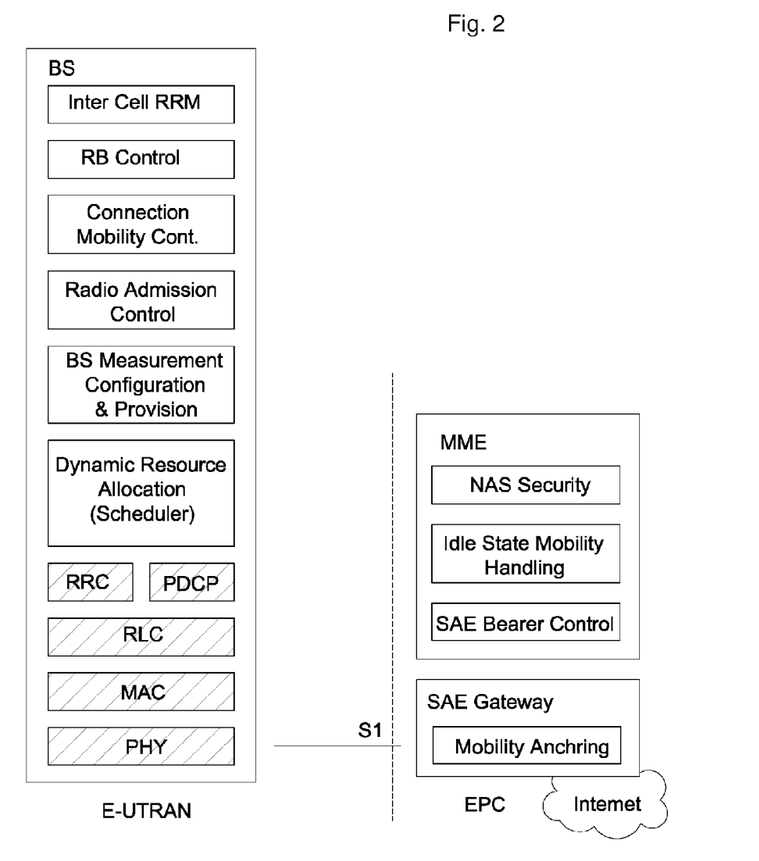
FIG. 2 is a block diagram showing a functional split between evolved universal terrestrial radio access network (E-UTRAN) and evolved packet core (EPC).

FIG. 2 is a block diagram showing a functional split between E-UTRAN and EPC.

Referring to FIG. 2, slant lined blocks represent radio protocol layers, and other blocks show functional entities of the control plane.

The base station hosts following functions: (1) functions for radio resource management such as a radio bearer control, radio admission control, connection mobility control and dynamic allocation of resources to user equipments in both uplink and downlink (scheduling), (2) Internet protocol (IP) header compression and encryption of user data streams, (3) routing of user plane data towards an SAE gateway, (4) scheduling and transmission of paging messages, (5) scheduling and transmission of broadcast information and (6) measurement and measurement reporting configuration for mobility and scheduling.

The MME hosts following functions: (1) distribution of paging messages to the base stations, (2) security control, (3) idle state mobility control, (4) SAE bearer control and (5) ciphering and integrity protection of non-access stratum (NAS) signaling.

The SAE gateway hosts following functions: (1) termination of user plane packets for paging reasons and (2) switching of user plane for support of user equipment mobility.

Layers of the radio interface protocol between the user equipment and the base station can be classified into L1 (a first layer), L2 (a second layer), and L3 (a third layer) based on the lower three layers of the open system interconnection (OSI) model that is well-known to communication systems. The physical layer belonging to the first layer provides an information transfer service using a physical channel. A radio resource control (RCC) layer belonging to the third layer serves to control radio resources between the user equipment and the network. The UE and the network exchange RRC messages via the RRC layer.

Figure 3:
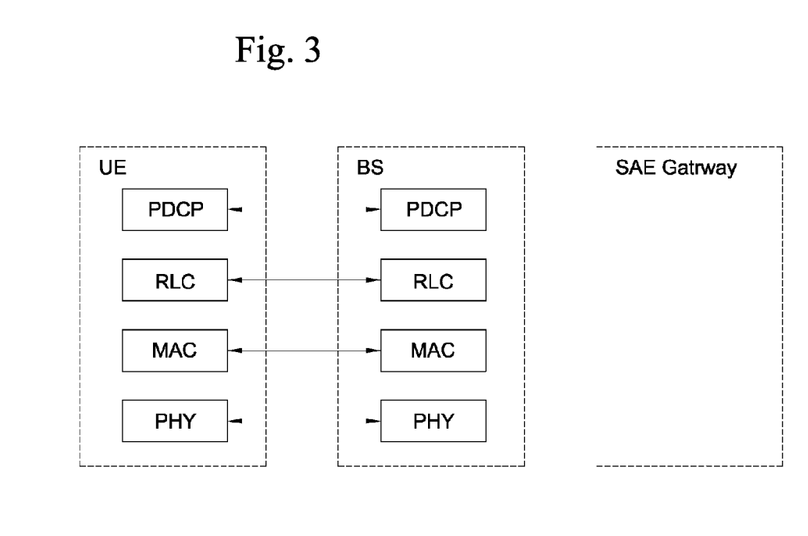
FIG. 3 is a block diagram showing the radio protocol architecture of a user plane.
Figure 4:
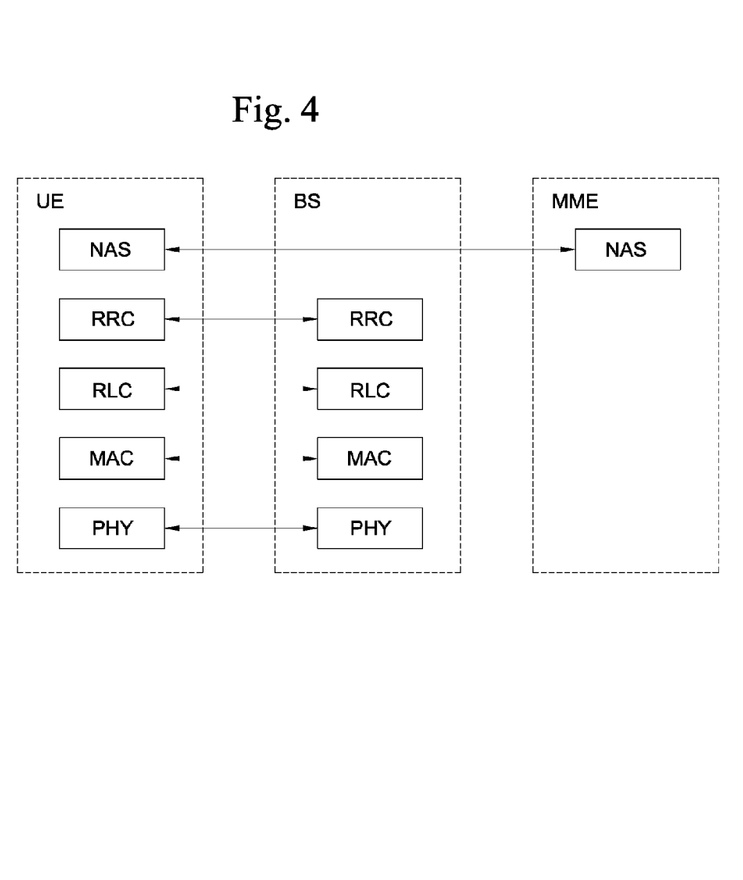
FIG. 4 is a block diagram showing the radio protocol architecture of a control plane.

FIG. 3 is a block diagram showing the radio protocol architecture of a user plane, and FIG. 4 is a block diagram showing the radio protocol architecture of a control plane. These show the architectures of the radio interface protocol between the user equipment and the E-UTRAN. The data plane is a protocol stack for transmitting traffic data, and the control plane is a protocol stack for transmitting control signals.

Referring to FIGS. 3 and 4, a physical layer provides an information transfer service to an upper layer using a physical channel. The physical layer is connected to the medium access control (MAC) layer through a transport channel, and data are transferred between the MAC layer and the physical layer via a transport channel. Data moves between the MAC layer and the physical layer via the transport channel. Data moves between different physical layers, that is, a physical layer for a transmitter and a physical layer for a receiver, via the physical channel. The physical layer can modulate data in the orthogonal frequency division multiplexing (OFDM) scheme and may use time and frequency (subcarrier) as radio resources.

The MAC layer which belongs to the second layer provides a service to a radio link control (RLC) layer, which is the upper layer of the MAC layer, via a logical channel. The RLC layer which belongs to the second layer supports reliable data transfer.

A packet data convergence protocol (PDCP) layer which belongs to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

The radio resource control (RRC) layer which belongs to the third layer is defined only on the control plane. The RRC layer serves to control the logical channel, the transport channel and the physical channel in association with configuration, reconfiguration and release of a radio bearer (RB). The RB is a service provided by the second layer for data transmission between the user equipment and the E-UTRAN. If an RCC connection is established between the RCC of the user equipment and the RCC of the network, the user equipment is in an RCC connection mode, and otherwise, the user equipment is in an RCC idle mode.

A NAS layer which belongs to the upper layer of the RCC layer performs authentication, SAE bearer management, security control, and the like.

A downlink transport channel for transmitting data from the network to the user equipment includes a broadcast channel (BCH) for transmitting system information and a downlink-shared channel (DL-SCH) for transmitting user traffics or control messages. Multicast traffics or broadcast traffics can be transmitted via the DL-SCH or a downlink-multicast channel (DL-MCH). A downlink physical channel mapped to the downlink transport channel includes a physical downlink shared channel (PDSCH) mapped to the DL-SCH and a physical downlink control channel (PDCCH) for transmitting control signals for the PDSCH.

An uplink transport channel for transmitting data from the user equipment to the network includes a random access channel (RACH) for transmitting initial access messages and an uplink-shared channel (UL-SCH) for transmitting user traffics or control messages. An uplink physical channel includes a physical random access channel (PRACH) mapped to the RACH and a physical uplink shared channel (PUSCH) mapped to the UL-SCH.

The RACH which is the uplink transport channel is used to transmit short-length data through the uplink. Some of RCC messages, such as an RRC connection request message, cell update message, URA update message, and the like, are transmitted via the RACH. The logical channel, such as common control channel (CCCH), dedicated control channel (DCCH) or dedicated traffic channel (DTCH), can be mapped to the RACH. The RACH is mapped to the physical channel, PRACH.

Figure 5:
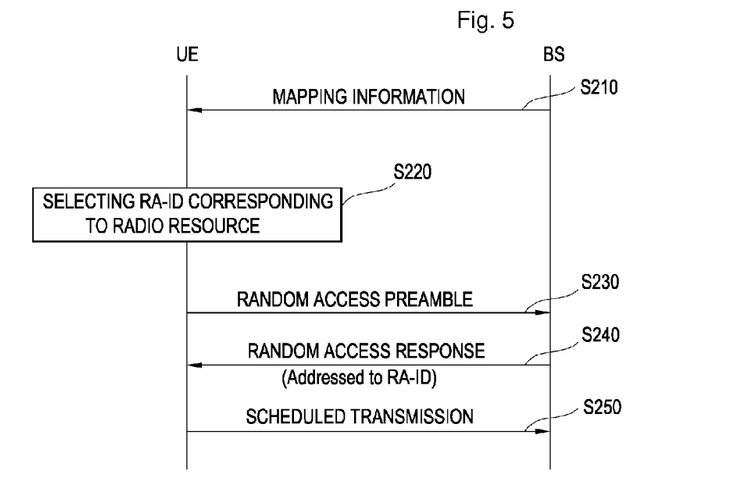
FIG. 5 is a flowchart illustrating a random access procedure according to an embodiment of the present invention.

FIG. 5 is a flowchart illustrating a random access procedure according to an embodiment of the present invention.

Referring to FIG. 5, a user equipment receives mapping information from a base station S210. The mapping information is the information on mapping relation between radio resources used for transmitting a random access preamble and a random access identifier (RA-ID).

The RA-ID is an identifier to identify the user equipment performing a random access procedure. The RA-ID identifies a random access occasion or a random access group. The random access group is a set of random access occasions. The random access occasion means time-frequency resources used for transmitting the random access preamble. When the RA-ID is arrived, the user equipment reads information addressed by the RA-ID. On the contrary, a cell-radio network temporary identifier (C-RNTI) is an identifier to identify the user equipment within a cell.

The mapping information includes the information on mapping relation between radio resources used for transmitting the random access preamble and the RA-ID. The mapping information may be an RRC message. The mapping information can be transmitted through system information or a paging message. The radio resources are time-frequency resources used for transmitting the random access preamble. The radio resources may include time resources and/or frequency resources. The radio resources may be represented as transmission intervals, resource blocks, and the like that are used for transmitting the random access preamble. If the random access preamble is transmitted via the PRACH, the radio resources can be time-frequency resources allocated for the PRACH.

The user equipment selects a signature and radio resources for transmitting the random access preamble S220. As the radio resources are selected, the user equipment selects an RA-ID corresponding to the radio resources based on the mapping information.

The user equipment transmits the random access preamble to the base station through the radio resources S230. The random access preamble is a physical layer message constructed in the physical layer. The random access preamble is transmitted via the PRACH.

The base station transmits a random access response as a response to the random access preamble S240. The random access response can be a MAC message constructed in the MAC layer that is an upper layer of the physical layer. The random access response can be transmitted via the DL-SCH. The random access response is addressed by the RA-ID transmitted via an L1/L2 control channel. The L1/L2 control channel is a control channel associated with the DL-SCH. Through the L1/L2 control channel, the base station transmits the RA-ID corresponding to the radio resources through which the random access preamble is transmitted, using the mapping information. The user equipment that has transmitted the random access preamble prepares to receive the random access response based on the RA-ID. If the RA-ID is received from the base station, the user equipment receives a random access response addressed by the RA-ID.

The random access response can include at least any one of timing alignment information, initial uplink grant and a temporary C-RNTI. The timing alignment information is timing compensation information for uplink transmission. The initial uplink grant is ACK/NACK information for granting uplink transmission. The temporary C-RNTI is a C-RNTI that is temporarily used before contention resolution is completed.

The user equipment performs scheduled uplink transmission via the UL-SCH S250.

The RA-ID used in the random access procedure is mapped to the radio resources used for transmitting the random access preamble. The RA-ID is an identifier used for addressing the random access response between the base station and the user equipment when the random response is transmitted and received.

It is assumed that a random access interval is 10 ms. Radio resources comprising time and frequencies for transmitting at least one or more random access preambles is allocated for the random access interval. The radio resources for performing random accesses are repeatedly allocated for every random access intervals. Since two or more random accesses may be received for the random access interval, the base station may transmit two or more random access responses. The user equipment has to identify its own random access response. For example, it is assumed that the starting point of the Nth random access interval is T and the ending point of the Nth random access interval is T+10. It is assumed that a first user equipment transmits a first random access preamble at T+2 and a second user equipment transmits a second random access preamble at T+3. Random access responses for the two random access preambles are transmitted at T+7. At this point, there is ambiguity about which of the two random access responses is actually received by the first user equipment or the second user equipment.

If the RA-ID is in a mapping relation with the radio resources of the random access preamble, the ambiguity can be resolved. If a first RA-ID is mapped to the first random access preamble and a second RA-ID is mapped to the second random access preamble, the first user equipment can immediately confirm a random access response addressed by the first RA-ID as its response.

Figure 6:
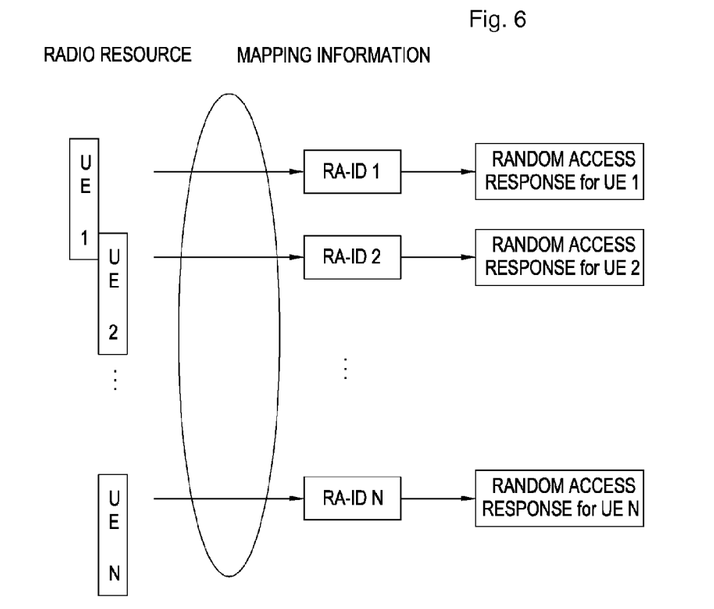
FIG. 6 is a view showing an example of a random access procedure.

FIG. 6 is a view showing an example of a random access procedure.

Referring to FIG. 6, N user equipments (UE 1, UE 2, . . . , and UE N) respectively perform a random access procedure. Each of the user equipments transmits a random access preamble through selected radio resources. Each of the user equipments can transmit a random access preamble through radio resources different from those of others in a time and/or frequency domain.

A base station searches for RA-IDs corresponding to respective user equipments from the radio resources used by the received random access preambles using the mapping information. The base station transmits a random access response addressed by the RA-ID for each of the user equipments. Each of the user equipments can identify its random access response by receiving a random access response addressed by its RA-ID.

For example, the random access preamble of a first user equipment UE corresponds to the first RA-ID RA-ID 1, and the random access preamble of a second user equipment UE 2 corresponds to the second RA-ID RA-ID 2. The first user equipment UE 1 receives a random access response addressed by the first RA-ID RA-ID 1. Since the first user equipment UE 1 knows that the RA-ID for the random access preamble transmitted by itself is the first RA-ID RA-ID 1 through the mapping information, it can immediately receive the random access response. Accordingly, a upper layer message for identifying a random access response is not needed.

A user equipment obtains mapping information between the radio resources used in the random access procedure and the RA-ID through system information or the like. The user equipment selects a signature and radio resources and transmits a random access preamble through the selected signature and radio resources. Subsequently, the user equipment searches for the RA-ID through the L1/L2 control channel. The user equipment receives a DL-SCH message, i.e., its random access response, addressed by the RA-ID.

A user equipment maps the radio resources used in the process of performing a random access to a RA-ID. A random access response is addressed by the RA-ID. Since it is not necessary to transmit upper layer message for identifying the random access response, the number of messages exchanged between the user equipment and the base station can be reduced, and power consumption of the user equipment can be decreased.

Figure 7:
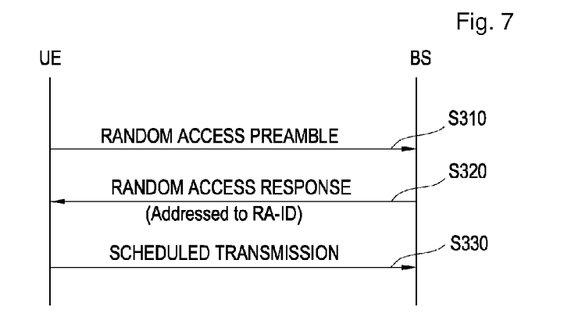
FIG. 7 is a flowchart illustrating a random access procedure according to another embodiment of the present invention.

FIG. 7 is a flowchart illustrating a random access procedure according to another embodiment of the present invention.

Referring to FIG. 7, a user equipment transmits a random access preamble to a base station through the selected radio resources S310. Here, unlike the embodiment of FIG. 5, the mapping information is not transmitted through the system information, but both the user equipment and the base station previously know the mapping information. The user equipment selects a signature and radio resources for transmitting the random access preamble and searches for a RA-ID corresponding to the selected radio re sources based on previously stored mapping information.

The base station transmits a random access response as a response to the random access preamble S320. The random access response is addressed by the RA-ID transmitted via a L1/L2 control channel. The user equipment that has transmitted the random access preamble prepares to receive a random access response based on the selected RA-ID. If the RA-ID is arrived from the base station, the user equipment receives the random access response addressed by the RA-ID.

The user equipment performs scheduled uplink transmission via a UL-SCH S330.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for performing a random access procedure in a wireless communication system, the method performed by a base station comprising:
   receiving a random access preamble by using a random access resource from a user equipment;
   transmitting a downlink control channel to be identified by a random access identifier to the user equipment, wherein the random access identifier is determined by the user equipment based on the random access resource; and
   transmitting a random access response to the user equipment as a response to the random access preamble on a downlink shared channel that is associated with the identified downlink control channel.

2. The method of claim 1, wherein the random access response includes time alignment information, an uplink grant and a temporary Cell-Radio Network Temporary Identifier (C-RNTI).

3. The method of claim 2, further comprising:
   receiving a scheduled message by using the uplink grant from the user equipment.

4. The method of claim 1, wherein the downlink control channel includes a physical downlink control channel (PDCCH) and the downlink shared channel includes a physical downlink shared channel (PDSCH).

5. The method of claim 1, further comprising:
   transmitting mapping information to the user equipment, the mapping information indicating a mapping between the random access resource and the random access identifier.

6. A base station configured for performing a random access procedure in a wireless communication system, the base station comprising:
   a memory; and
   a processor operatively coupled with the memory, that:
      receives a random access preamble by using a random access resource from a user equipment;
      transmits a downlink control channel identified by a random access identifier to the user equipment, wherein the random access identifier is determined by the user equipment based on the random access resource; and
      transmits a random access response to the user equipment as a response to the random access preamble on a downlink shared channel that is associated with the identified downlink control channel.

7. The base station of claim 6, wherein the random access response includes time alignment information, an uplink grant and a temporary Cell-Radio Network Temporary Identifier (C-RNTI).

8. The base station of claim 7, wherein the processor further receives a scheduled message by using the uplink grant from the user equipment.

9. The base station of claim 6, wherein the downlink control channel includes a physical downlink control channel (PDCCH) and the downlink shared channel includes a physical downlink shared channel (PDSCH).

10. The base station of claim 6, wherein the processor further transmits mapping information to the user equipment, the mapping information indicating a mapping between the random access resource and the random access identifier.

* * * * *